(12) United States Patent
Shi

(10) Patent No.: US 12,535,519 B2
(45) Date of Patent: Jan. 27, 2026

(54) DEVICES AND METHODS FOR NOISE TESTING OF A SUBSTRATE INCLUDING THROUGH SILICON VIAS

(71) Applicant: SHANGHAI UNITED IMAGING MICROELECTRONICS TECHNOLOGY CO., LTD., Shanghai (CN)

(72) Inventor: Changzhi Shi, Shanghai (CN)

(73) Assignee: SHANGHAI UNITED IMAGING MICROELECTRONICS TECHNOLOGY CO., LTD., Shanghai (CN)

( * ) Notice: Subject to any disclaimer, the term of this patent is extended or adjusted under 35 U.S.C. 154(b) by 307 days.

(21) Appl. No.: 18/342,694

(22) Filed: Jun. 27, 2023

(65) Prior Publication Data

US 2023/0417818 A1 Dec. 28, 2023

(30) Foreign Application Priority Data

Jun. 27, 2022 (CN) .......................... 202210733014.9

(51) Int. Cl.
*G01R 31/26* (2020.01)
(52) U.S. Cl.
CPC ................... *G01R 31/2646* (2013.01)
(58) Field of Classification Search
None
See application file for complete search history.

(56) References Cited

U.S. PATENT DOCUMENTS

| | | | |
|---|---|---|---|
| 9,966,318 B1* | 5/2018 | Pagani | H01L 23/481 |
| 11,004,530 B2* | 5/2021 | Vogelsang | G11C 8/10 |
| 2012/0018723 A1* | 1/2012 | Su | H01L 22/34 |
| | | | 257/E21.531 |
| 2012/0138927 A1* | 6/2012 | Kang | H01L 25/0657 |
| | | | 257/E23.002 |
| 2014/0209907 A1 | 7/2014 | Jeong et al. | |
| 2015/0340327 A1* | 11/2015 | Uzoh | H01L 21/76898 |
| | | | 438/109 |
| 2023/0417818 A1* | 12/2023 | Shi | G01R 31/2646 |
| 2023/0417825 A1* | 12/2023 | Shi | G01R 31/2868 |

FOREIGN PATENT DOCUMENTS

| | | |
|---|---|---|
| CN | 103165577 A | 6/2013 |
| CN | 203631539 U | 6/2014 |
| CN | 104576434 A | 4/2015 |
| CN | 104752406 A | 7/2015 |
| CN | 104793120 A | 7/2015 |
| CN | 104752406 B | 10/2017 |

OTHER PUBLICATIONS

First Office Action in Chinese Application No. 202210733014.9 mailed on Apr. 1, 2025, 13 pages.

\* cited by examiner

*Primary Examiner* — Jermele M Hollington
(74) *Attorney, Agent, or Firm* — METIS IP LLC

(57) ABSTRACT

Embodiments of the present disclosure provide a device and a method for noise testing of a substrate including through silicon vias (TSVs). The device may include a substrate including first TSVs; an excitation link including at least two groups of second TSVs; an insulation layer arranged between the excitation link and the substrate; and a testing link including at least one group of third TSVs, the testing link being electrically connected with the substrate.

17 Claims, 7 Drawing Sheets

1000

Applying a pulse signal to an excitation link, wherein the excitation link includes at least two groups of second through silicon vias (TSVs) arranged on a substrate, and an insulation layer is arranged between the excitation link and the substrate ~1010

↓

Obtaining one or more response signals in a testing link, wherein the testing link includes at least one group of third TSVs, and the testing link is electrically connected with the substrate ~1020

↓

Determining, based on the one or more response signals, a noise level and a distribution of a noise of the substrate ~1030

┌─────────────────────────────────────┐
│ Applying a pulse signal to a first excitation through
│ silicon via (TSV) and a second excitation TSV,
│ wherein the first excitation TSV and the second          ~1110
│ excitation TSV are both embedded on a first side of
│ a substrate, and the first excitation TSV and the
│ second excitation TSV are electrically connected to
│ form an excitation TSV pair
└─────────────────────────────────────┘
                    ↓
┌─────────────────────────────────────┐
│ Obtaining a grounding response pulse signal of at
│ least one group of testing regions arranged around       ~1120
│ one of the first excitation TSV and the second
│ excitation TSV
└─────────────────────────────────────┘
                    ↓
┌─────────────────────────────────────┐
│ Determining, based on one or more grounding
│ response signals of one or more groups of testing        ~1130
│ regions, a noise level and distribution of a noise of a
│ substrate including TSVs
└─────────────────────────────────────┘

FIG. 11

DEVICES AND METHODS FOR NOISE TESTING OF A SUBSTRATE INCLUDING THROUGH SILICON VIAS

CROSS-REFERENCE TO RELATED APPLICATIONS

This application claims priority to Chinese Patent Application No. 202210733014.9, filed on Jun. 27, 2022, the entire contents of which are incorporated herein by reference.

TECHNICAL FIELD

The present disclosure relates to the field of semiconductor, in particular, to devices and methods for noise testing of a substrate including through silicon vias (TSVs).

BACKGROUND

With the rapid development of the integrated circuit and the semiconductor industry, the Moore's Law faces challenges from the physical limits of chips, processing technology limits, manufacturing cost limits, and other aspects. Thus, the three-dimensional (3D) integration technology represented by through a silicon via (TSV) technique expands the integration dimension of chips from two dimension to a vertical direction of three dimension, thereby achieving the 3D stacking of chips. On the one hand, a TSV technique not only greatly improves chip integration degree, but also shortens the length of interconnects between chips. On the other hand, when using the TSV technique for 3D stacking of chips, the impact from the noise of a substrate introduced by the TSV on the chip performance cannot be ignored.

Therefore, it is desirable to provide a simplified device and method for noise testing of a substrate including through silicon vias (TSVs) with improved efficiency and accuracy, which is easy to analyze failure and reliability.

SUMMARY

An aspect of the present disclosure provides a device. The device may include a substrate including first through silicon vias (TSVs); an excitation link including at least two groups of second TSVs; an insulation layer arranged between the excitation link and the substrate; and a testing link including at least one group of third TSVs, the testing link being electrically connected with the substrate.

Another aspect of the present disclosure provides a method implemented on a device including a substrate including first TSVs; an excitation link including at least two groups of second TSVs; an insulation layer arranged between the excitation link and the substrate; and a testing link including at least one group of third TSVs, the testing link being electrically connected with the substrate. The method may include applying a pulse signal to the excitation link; obtaining one or more response signals in the testing link; and determining, based on the one or more response signals, a noise level and a distribution of a noise of the substrate.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein:

FIG. 10 is a flowchart illustrating an exemplary process of a method for noise testing of a substrate including TSVs according to some embodiments of the present disclosure; and FIG. 11 is another flowchart illustrating an exemplary process of a method for noise testing of a substrate including TSVs according to some embodiments of the present disclosure.

DETAILED DESCRIPTION

Figure 1:
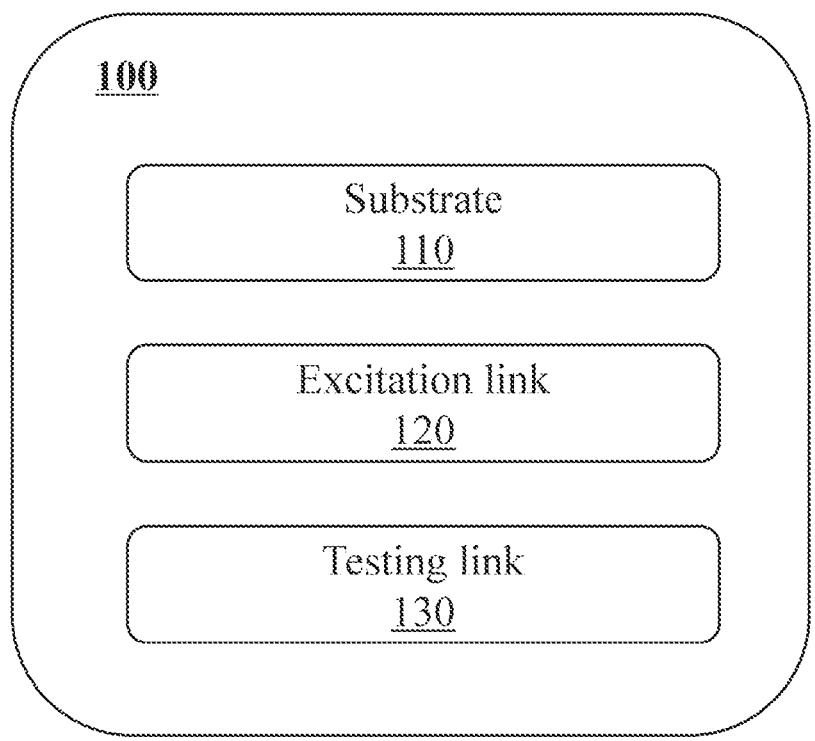
FIG. 1 is a schematic diagram illustrating an exemplary device for noise testing of a substrate including through silicon vias (TSVs) according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary device for noise testing of a substrate including through silicon vias (TSVs) according to some embodiments of the present disclosure.

Compared with the conventional integration technologies, the through silicon via (TSV) technique may effectively improve the integration degree and the performance of chips with a lower cost. However, when using the TSV technique for the three-dimensional (3D) of chips, the impact of the noise of a substrate introduced by the TSVs on the performance of chips cannot be ignored. It is necessary to perform a noise testing on the substrate including the TSVs to detect the performance of the TSVs. The embodiments of the present disclosure may provide a simplified device 100 for noise testing of a substrate including the TSVs shown in FIG. 1. The device 100 for noise testing of a substrate including TSVs may include a substrate 110, an excitation link 120, and a testing link 130. The excitation link 120 and the testing link 130 may be used to measure the noise of the substrate including the TSVs and provide a design basis for a circuit, which is easy to analyze for failure and reliability.

In some embodiments, the device 100 may include the substrate 110, the excitation link 120, and the testing link 130. First TSVs may be arranged on the substrate 110. The excitation link 120 may include at least two groups of second TSVs, and an insulation layer may be arranged between the excitation link 120 and the substrate 110. The testing link 130 may include at least one group of third TSVs, and the testing link 130 may be electrically connected with the substrate. The first TSVs may be include all TSVs arranged on the substrate, that is, the first TSVs may include all TSVs in the device 100. In some embodiments, the first TSVs may include the at least two groups of second TSVs and the at least one groups of third TSVs.

The substrate 110 may be a wafer made of a semiconductor single crystal. The substrate 110 is a main substrate of the first TSVs and may play a supporting and fixing role in a production and fabrication process of the TSVs. In some embodiments, a material of the substrate 110 may be silicon (Si) or other semiconductor materials, such as germanium, gallium arsenide, etc.

In some embodiments, one or more TSVs may be formed by etching on a semiconductor wafer. The semiconductor wafer may be the substrate 110. The first TSVs may be formed on the substrate 110. A first side of the substrate 110 may be the top of the substrate 110, and a second side may be the bottom of the substrate 110. The first side may be opposite to the second side, and the first side and the second side may be perpendicular to an axial direction of a TSV among the first TSVs, the at least two groups of second TSVs, and the at least one group of third TSVs, and the first TSVs, the at least two groups of second TSVs, and the at least one group of third TSVs may pass through the first side and second side of the substrate 110. The detailed descriptions for the substrate 110 and the first side and second side may be found elsewhere in the present disclosure, for example, FIG. 2 and the relevant descriptions.

TSV is a vertical conduction structure between chips, or wafers. TSV may achieve an interconnection between the chips or wafers. The TSV technique may achieve a vertical electrical interconnection of TSVs by opening holes in the wafer and filling the holes with conductive substances such as copper, tungsten, polycrystalline silicon, etc. The ways of opening holes may include etching, laser drilling, etc.

It should be noted that the material of a TSV in the embodiments of the present disclosure may not limited to a silicon wafer, and the shape and doping situation of the TSV may also not be limited. Any other materials with TSV structure and function, such as germanium (Ge), gallium arsenide (GaAs), indium phosphide (InP), silicon carbide (SiC), gallium nitride (GaN), graphene material, etc., may also use the testing structure and testing method provided in the embodiments of the present disclosure.

The production process of the TSVs may include an etching process and a laser process. The etching process may be a technique selectively corroding or peeling off a surface of a semiconductor or a thin film covering the surface. In some embodiments, the etching process may include dry etching and wet etching.

In the dry etching process, a TSV may be etched on the substrate to create sidewall insulation, and a metal may be deposited on the top, sidewall, and bottom of the TSV, thereby playing an electrical connection role. The method for creating the sidewall insulation may be depositing a layer of silicon dioxide to avoid contact between TSV and bulk silicon. After finishing the dry etching process, a circuit connection may be designed using a technology of re-distribution layer (RDL) on the TSV.

In the wet etching process, an HF acid may be used to perform a wet etching after a sidewall insulation is finished. To prevent the HF acid from corroding other layer structures below the TSV, a barrier layer may be added at the bottom of the TSV. The sidewall insulation layer may be corroded in the wet etching process, making the TSV in contact with the bulk silicon, thereby achieving a good grounding of the TSV.

In some embodiments, the substrate 110 may include the first TSVs obtained using different production processes.

In some embodiments, in the process of making the TSV, the TSV may be made hollow inside or may be filled with some insulating materials, such as polyimide, to avoid the ingress of external moisture, and impurities, or other substances from affecting the performance of the TSV.

The excitation link 120 may be an electrical link that transmits an excitation signal when testing a noise of the substrate including the TSVs. In some embodiments, one or more TSVs may be a component of the excitation link 120. When a pulse signal is passing through the excitation link 120, a corresponding noise disturbance to the ground or to the one or more TSVs surrounding the substrate 110 may be generated. The noise disturbance generated in the substrate 110 may be detected in a neighbor region of the excitation link 120. The excitation link 120 may assist in detecting the noise of the substrate. In some embodiments, the excitation link 120 may include at least two groups of second TSVs. Each group of TSVs may merely include one TSV or may be a TSV cluster including a plurality of TSVs.

In some embodiments, an insulation layer may be arranged between the excitation link 120 and the substrate 110 to electrically isolate the excitation link 120 from the substrate 110. In some embodiments, a material of the insulation layer may be a material such as plastic, glass, rubber, ceramics, etc. that can effectively prevent a flow of a current. In some embodiments, the material of the insulation layer may be polyethylene, polypropylene, polyvinyl chloride, polystyrene, polyimide, etc. In some embodiments, the insulation layer may be deposited silica.

In some embodiments, a metal layer may also be arranged at the bottom of the substrate 110, and the metal layer may cover the insulation layer except for a grounding TSV, conducting the at least two groups of second TSVs to form the excitation link 120.

In some embodiments, at least one of the first TSVs on the substrate 110 may form a structure with one end opening after covering the insulation layer and metal layer, and the end of the opening of the at least one TSV may be on the first side of the substrate 110.

In some embodiments, an electrical path of the excitation link 120 may pass through the at least two groups of second TSVs of the excitation link 120 along an axial direction of a TSV among the first TSVs, the at least two groups of second TSVs, and the at least one group of third TSVs. The electrical path of the excitation link 120 may be a path for receiving a pulse signal. The axial direction of the TSV may be a direction of an embedded TSV in the substrate 110, and the axial direction of the TSV may be perpendicular to the first side and the second side of the substrate 110. Due to the electrical path of excitation link 120 passing through the at least two groups of second TSVs of the excitation link 120 along the axial direction, the pulse signal received by excitation link 120 may also pass through the at least two groups of second TSVs of the excitation link 120 along the axial direction, causing a corresponding noise disturbance to the ground or surrounding TSVs to detect the noise of substrate 110.

In some embodiments, the at least two groups of second TSVs of the excitation link 120 may include a first excitation TSV and a second excitation TSV. The detailed descriptions for the excitation link 120 and the first side and second side may be found elsewhere in the present disclosure, for example, FIG. 2 and the relevant descriptions.

The testing link 130 may be used to detect a grounding disturbance signal from the substrate 110. In some embodiments, the testing link 130 may include at least one group of third TSVs, at least one group of third TSVs may include a grounding TSV, and the testing link may be electrically connected with the substrate. The detailed descriptions for the grounding TSV may be found elsewhere in the present disclosure, for example, FIG. 2 and the relevant descriptions. When a pulse signal (e.g., a square wave pulse) passes through the excitation link 120, a corresponding noise disturbance (e.g., a burr signal) may be generated, thus a pulse amplitude for a grounding response in a neighbor region (i.e., the testing link 130) may be detected, thereby obtaining the noise of the substrate 110. The noise of the substrate may be represented by a voltage value corresponding to a burr peak. For example, the noise of the substrate may be generally measured by millivolts (mV) or microvolts (μV).

In some embodiments, the testing link 130 may include one or more testing regions and a grounding region, and the one or more testing regions may be electrically connected with the grounding region via the substrate 110. The detailed description for the testing link 130 may be found elsewhere in the present disclosure, for example, FIG. 2 and the relevant descriptions.

In some embodiments, the device 100 may also include a carrier wafer (not shown), and the carrier wafer may be detachably connected with the substrate 110. The carrier wafer may serve as a support and increase the mechanical strength of the substrate 110. In some embodiments, the carrier wafer may be arranged below the substrate 110. In some embodiments, the material of the wafer carrier may be silicon or glass. By detachable connection between the carrier wafer and the substrate, when there is an abnormality (e.g., a lack of conduction, a circuit burnout, other performance abnormalities, etc.), the carrier wafer and the substrate may be disassembled for analysis of failure and reliability. The detailed description for the wafer carrier may be found elsewhere in the present disclosure, for example, FIG. 2 and the relevant descriptions.

In some embodiments of the present disclosure, the grounding response for the excitation link 120 to the neighbor region when the pulse signal passes through the excitation link 120 may be measured through the testing link 130, thereby obtaining the noise of the substrate 110. Thus, a device for noise testing of the substrate including the TSVs that simplifies the process and is easy to analyze failure and reliability may be obtained.

In some embodiments, the present disclosure may provide an apparatus for noise testing of a substrate. The substrate may be provided with first TSVs. The apparatus for noise testing of a substrate may include an excitation link and a testing link. The excitation link may include at least two groups of second TSVs, and an insulation layer may be arranged between the excitation link and the substrate. The testing link may include at least one group of third TSVs, and the testing link may be electrically connected with the substrate. More descriptions for the substrate, the excitation link and the testing link may found elsewhere in the present disclosure.

Figure 2:
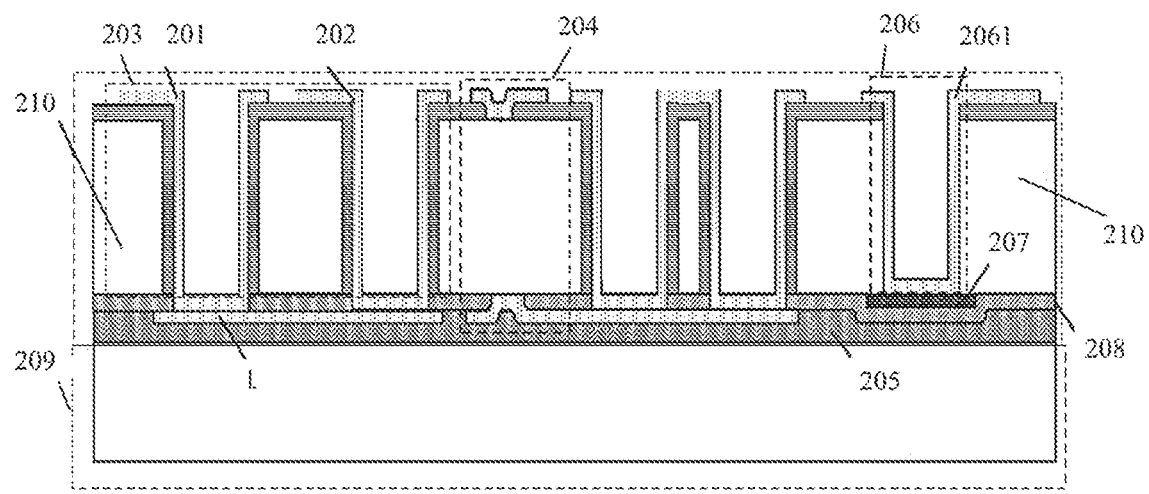
FIG. 2 is another schematic diagram illustrating an exemplary device for noise testing of a substrate including TSVs according to some embodiments of the present disclosure.

FIG. 2 is another schematic diagram illustrating an exemplary device for noise testing of a substrate including TSVs according to some embodiments of the present disclosure.

In some embodiments, as shown in FIG. 2, the device for noise testing of a substrate 210 including TSVs may include an excitation link and a testing link.

As shown in FIG. 2, in some embodiments, the substrate 210 may include first TSVs, and the excitation link may include at least two group of second TSVs. In some embodiments, the first TSVs may include the at least two groups of second TSVs. In some embodiments, each of the at least two groups of second TSVs may include one or more TSVs. The at least two groups of second TSVs may include a first excitation TSV 201 and a second excitation TSV 202. The first excitation TSV 201 and the second excitation TSV 202 may be TSVs used for transmitting excitation signals. Due to the possible shortcomings (e.g., insufficient insulation, etc.) in a preparation process of TSVs (e.g., the first excitation TSV and/or second excitation TSV), a disturbance signal may be generated in the substrate 210 when an excitation signal passes through the TSVs (e.g., the first excitation TSV and/or second excitation TSV).

In some embodiments, during the preparation process of the device of noise testing including TSVs, a thickness of the substrate 210 may be 10~300 μm. Merely by way of example, the first side of the substrate 210 may be thinned and polished until the thickness of the substrate 210 is in a range of 100-300 μm, and a deep-silicon etching may be performed to prepare the first excitation TSV 201 and the second excitation TSV 202. Alternatively, the first side of the substrate 210 may be thinned and polished until the thickness of the substrate 210 is in a range of 50~100 μm, and the deep-silicon etching may be performed to prepare the first excitation TSV 201 and the second excitation TSV 202. The thinned and polished thickness of the first side of the substrate 210 may not be limited in the present disclosure.

In some embodiments, the excitation link may include a connecting conductor and at least two interface ends. The connecting conductor may be electrically connected with the first excitation TSV 201 and the second excitation TSV 202 to form an excitation TSV pair 203. The at least two interface ends may be electrically connected with the first excitation TSV 201 and the second excitation TSV 202, respectively, for applying a pulse signal to the first excitation TSV 201 and the second excitation TSV 202. In some embodiments, the connecting conductor and at least two interface ends may be conductive materials, and the connecting conductor may be an extension lead, such as a re-distributed layer (RDL) metal electrode L, and the at least two interface ends may be metal pads.

In some embodiments, the at least two interface ends may be arranged on the first side of the substrate 210, and the connecting conductor may be arranged on the second side of the substrate 210. The first side of the substrate 210 may be at the top of the substrate 210, and the second side of the substrate 210 may be a side opposite the first side and at the bottom of the substrate 210. The first side and the second side may be two sides perpendicular to an axial direction of a TSV among the first TSVs, the at least two groups of second TSVs, and at least one group of third TSVs.

In some embodiments, the first excitation TSV 201 and the second excitation TSV 202 may both pass through the first side and the second side of the substrate 210, and the first excitation TSV 201 and the second excitation TSV 202 may be electrically connected to form an excitation TSV pair 203. Specifically, the first excitation TSV 201 and the second excitation TSV 202 may form an excitation TSV pair 203 based on an electrical connection with the connecting conductor and the at least two interface ends (not shown). In some embodiments, a metal layer of the excitation TSV pair 203 may be designated as an interface end directly as shown in FIG. 2.

In some embodiments, the device for noise testing of a substrate including TSVs may include a carrier wafer 209, and the substrate 210 may be adhered to the carrier wafer 209 through an adhesive layer 205. Based on the adhesive layer 205, the substrate 210 and the carrier wafer 209 may be temporarily bound, so that the carrier wafer 209 added to the lower part of the substrate 210 may be unbound or released. Thus, the carrier wafer 209 arranged on the second side of the substrate 210 may be released via an unbound process, facilitating the failure and reliability analysis for bottom structures of the TSVs arranged on the substrate 210. In some embodiments, the temporary binding adhesive layer between the substrate 210 and the carrier wafer 209 may be removed by any manner, such as light, solvent, dissolution, or mechanical means.

In the embodiment of the present disclosure, by the connection of the connecting conductor and the at least two interface ends with the excitation TSV pair 203, a pulse signal may be convenient to apply to the excitation TSV pair 203, thus a noise signal of the substrate 210 may be detected.

In some embodiments, the apparatus may further include a testing link. The testing link may include one or more testing regions 204 and a grounding region 206, and the one or more testing regions 204 and the grounding region may be electrically connected via the substrate 210. In some embodiments, the testing link may include at least one group of third TSVs, including a grounding TSV 2061, and the grounding TSV 2061 may be arranged in the grounding region 206.

The one or more testing regions may be used to detect a grounding response signal generated on the substrate 210 when a pulse signal passing through the excitation link. In some embodiments, the one or more testing region may be arranged within a preset range around the excitation TSV pair 203 of the excitation link.

In some embodiments, the one or more testing regions 204 may be arranged around the at least two groups of second TSVs (the excitation TSV pair 203). When applying the pulse signal to the excitation TSV pair 203, a noise level and a distribution of a noise of the substrate may be determined by measuring the grounding response signal of the one or more testing regions 204 when the pulse signal passing through the excitation TSV pair 203. In some embodiments, each of the one or more testing regions 204 may be arranged within a preset range from the excitation TSV pair 203. For example, the preset range may include a range of 20~300 um from the excitation TSV pair 203.

In some embodiments, the one or more testing regions 204 may include a contacting region and a testing interface. The contacting region may be a connection region for measuring the grounding response signal of substrate 210. In some embodiments, the contacting region may include an electrical connection structure between the substrate 210 and the testing interface. The testing interface may include a metal conductor (e.g., a metal pad, etc.) that facilitates an electrical connection with the external environment.

The grounding region 206 may be a region used to arrange the grounding TSV 2061. In some embodiments, the grounding region 206 may also include an interface end, and the interface end may be arranged on the first side of the substrate 210. The interface end of the grounding region may also be a metal pad used to assist in detecting the grounding response signal of the substrate 210 when the pulse signal passes through the excitation link in the testing region.

In some embodiments of the present disclosure, the interface end of the grounding region may be arranged on the first side of the substrate 210 to facilitate the detection of a signal from the grounding TSV 2061 via the interface end of the grounding region.

The grounding TSV 2061 may be a grounding TSV used to assist in detecting the noise of the substrate 210. By simultaneously detecting the grounding TSV 2061 and the one or more testing regions 204, a grounding disturbance signal of the one or more testing region 204 may be obtained.

In some embodiments, in order to obtain a clearer noise signal, a specific interval may be arranged between the grounding TSV 2061 in the grounding region and the TSV in the one or more testing regions. The interval may have a certain impact on a detected noise signal. For example, if the grounding TSV 2061 is close to a TSV in the one or more testing regions, a response signal generated in the substrate 210 may not be detected due to a short propagation distance of noise of the substrate 210. For example, if the grounding TSV 2061 is far from the TSV in the one or more testing region, the response signal generated in the substrate 210 may be impossible to be measured due to an excessive signal attenuation. In some embodiments, a distance between the TSV 2061 in the grounding region and an excitation TSV may be greater than a distance between the excitation TSV and a TSV of one of the one or more testing regions 204. A connecting line between the TSV 2061 and a TSV in one of the one or more testing regions 204 may not pass through a TSV cluster. The TSV 2061 may be designated as an endpoint of an extension line of the TSV in the one of the one or more testing regions 204 and a TSV cluster, and an interval between the TSV 2061 and the TSV in one of the one or more testing regions 204 may not be greater than three time of a distance from the TSV in one of the one or more testing regions 204 to the TSV cluster.

In some embodiments, a contact area between a conductor of the grounding TSV 2061 and the substrate 210 (i.e., a contact area between the grounding TSV 2061 and a side of the substrate 210) may not be less than 90% of an area of a side of the grounding TSV 2061, thus forming a good grounding connection. In some embodiments, the conductor of the grounding TSV 2061 may be in full contact with the substrate 210 without a block from an insulation layer as shown in FIG. 2. The grounding TSV 2061 may be embedded on the first side of the substrate 210, and the side of the grounding TSV 2061 may contact with the substrate 210 in a depth direction of the substrate 210, and may pass through the substrate 210 and be grounded.

In some embodiments, an etching barrier layer 207 may be arranged at the bottom of the grounding TSV 2061, and the etching barrier layer 207 may be arranged on the second side of the substrate 210 to prevent an over etching during a synchronous etching process with other TSVs. In some embodiments, as shown in FIG. 2, a projection of the etching barrier layer 207 may cover a projection of the grounding TSV 2061 in a direction perpendicular to an axial direction of a TSV among the first TSVs, the at least two groups of second TSVs, and the at least one group of third TSVs.

In some embodiments, an etching process of the grounding TSV 2061 may be different from other TSVs. Specifically, due to the need for good grounding of the grounding TSV 2061, a wet etching process may be used to corrode an insulation layer on a side of the grounding TSV 2061, while a dry etching may be used for other TSVs to avoid contact with the substrate 210.

In some embodiments, the bottom of the substrate 210 may be provided with an insulation layer 208. The insulation layer 208 may electrically isolate the at least two groups of second TSVs (e.g., the excitation TSV pair 203) and each of the one or more testing region from the substrate 210. The first excitation TSV 201 and the second excitation TSV 202 may be electrically connected via the RDL metal electrode L arranged under the insulation layer 208, and may be insulated from the substrate 210.

Merely by way of example, a preparation process of the insulation layer 208 may include: depositing the insulation layer 208 on a bottom, a sidewall of the first excitation TSV 201 and the second excitation TSV 202, and the substrate 210 surface based on a preparation of the first excitation TSV 201 and the second excitation TSV 202; removing the insulation layer 208 at the bottom and the sidewall of the grounding TSV 2061 by the wet etching process, removing the insulation layer 208 at the bottom of other TSVs by the dry etching process, and retaining the insulation layer 208 on the side of other TSVs. It can be understood that the insulation layer 208 on the sidewall of the grounding TSV 2061 may be removed by the wet etching process to form an electrical connection between the grounding TSV 2061 and the substrate 210.

In some embodiments, the testing link may include a plurality groups of testing regions, that is, the plurality groups of testing regions may be arranged within the preset range around the excitation TSV pair 203. Each of the plurality of groups of testing regions may be connected with a metal pad based on an extended electrode. The testing combination structure composed of each of the plurality of groups of testing regions, the extended electrode, and the metal pad may be arranged at different positions around the excitation TSV pair 203 to obtain a noise situation of the excitation TSV pair 203 at different positions around the substrate. More descriptions for the metal pad may be found elsewhere in the present disclosure, for example, FIG. 3 and relevant description.

It should be noted that the structure diagram shown in FIG. 2 is merely a schematic diagram of one group of testing regions, and in practical applications, a count of the plurality of groups of testing regions may not be limited to 1. In some embodiments, the extended electrode and the metal pad may be prepared after the insulation layer 208 is prepared and the metal layers inside the TSVs and the metal layers on a surface of the substrate 210 are deposited.

In some embodiments of the present disclosure, by providing the one or more testing regions 204, the grounding region, and the grounding TSV 2061, the grounding disturbance signals in different regions may be determined, which may more accurately detect the noise signal of the substrate 210.

Figure 3:
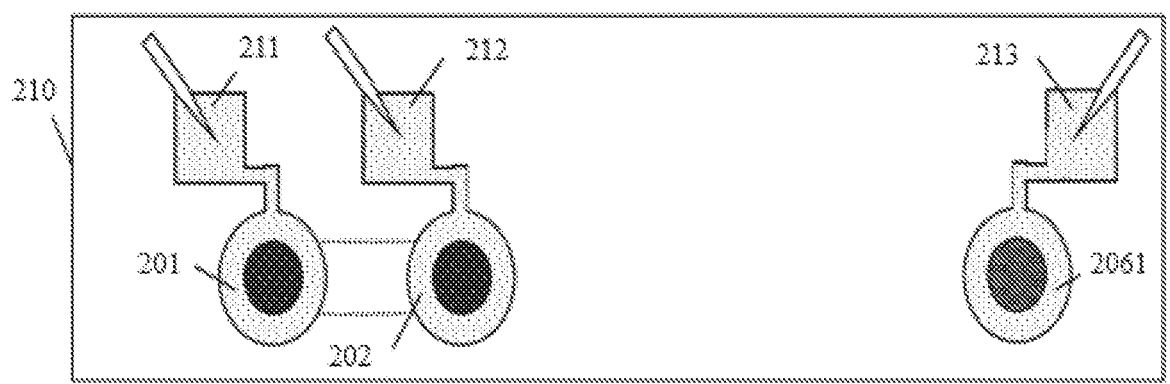
FIG. 3 is another schematic diagram illustrating an exemplary device for noise testing of a substrate including TSVs according to some embodiments of the present disclosure.

FIG. 3 is another schematic diagram illustrating an exemplary device for noise testing of a substrate including TSVs according to some embodiments of the present disclosure.

In some embodiments, FIG. 3 is a vertical view of a device for noise testing of a substrate including TSVs from a direction of a first side of a substrate 210. In some embodiments, an interface end may include a first metal pad 211 and a second metal pad 212 arranged on the first side of the substrate 210. A first excitation TSV 201 may be connected with the first metal pad 211 through an extended lead, and a second excitation TSV 202 may be connected with the second metal pad 212 through an extended lead.

A metal pad may be used to apply a pulse signal or detect a noise signal. For example, the pulse signal may be applied to an excitation TSV pair 203 based on the first metal pad 211 and the second metal pad 212. In some embodiments, the metal pad may be connected with a corresponding TSV through an extended lead. An extension lead may be a metal extended electrode, such as an RDL metal electrode.

In some embodiments, a grounding TSV 2061 may be connected with the metal pad 213 of the grounding TSV through the extended lead. A bottom, a side, and an opening of the excitation TSV pair 203 and the grounding TSV 2061 may be covered with metal electrode layers, which may be connected with a corresponding metal pad based on extended leads prepared on the insulation layer 2081 of the substrate 210, respectively.

In some embodiments, a testing link may also include one or more groups of testing regions, each group of testing regions may be provided with a corresponding metal pad (not shown), to facilitate a probe to measure a grounding response signal generated in the substrate 210 of one or more testing regions based on the metal pad for a noise testing of the substrate.

Based on above-mentioned device of noise testing, in a practical application, when performing noise testing for the substrate, the pulse signal may be applied at both ends of the excitation TSV pair 203 based on the first metal pad 211 and the second metal pad 212. Then, a grounding disturbance signal (i.e., a grounding response signal) generated in the substrate 210 of each testing region may be detected based on the metal pad in the each testing region (not shown) and the metal pads 213 of the grounding TSV. Based on the detected grounding response signal, a noise level and a distribution of the noise of the substrate caused by the excitation TSV pair 203 may be determined.

Merely by way of example, a specific process of determining the noise level and the distribution of the noise of the substrate noise may include: after applying the pulse signal to both ends of the excitation TSV pair 203, a noise burr signal (i.e., the grounding disturbance signal or the grounding response signal) of the each testing region may be obtained. Then, by measuring an amplitude and an integral area of the noise burr signal, the noise burr signal may be analyzed to determine the noise level and an action period or a time of the noise of the substrate caused by the excitation TSV pair 203.

In some embodiments of the present disclosure, a first excitation TSV 201 and a second excitation TSV 202 in the device may both be embedded on the first side of the substrate 210, and the first excitation TSV 201 and the second excitation TSV 202 may be electrically connected to form the excitation TSV pair 203. The one or more groups of testing regions may be arranged around the excitation TSV pair 203. After applying the pulse signal to the excitation TSV pair 203, the noise level and the distribution of the noise of the substrate may be determined by measuring the grounding response signal caused by the excitation TSV pair 203 in the substrate 210 when the pulse signal passing through the each testing region. A preparation process of the device of noise testing is compatible with a conventional preparation process of the TSVs, and a deep-silicon etching of all TSVs may be completed in one step. The preparation process for overall structures of the device is simple, thus simplifying a testing structure for obtaining the noise of the substrate of the excitation TSVs. Based on the device, the noise of the substrate caused by the excitation TSV pair 203 may be obtained by measuring the grounding response signal generated in the substrate 210 of at least one testing region when the pulse signal passing through the excitation TSV pair, thereby effectively obtaining the noise of the substrate caused by the excitation TSV pair 203.

In some embodiments, the pulse signal applied at both ends of the excitation TSV pair 203 on the first metal pad 211 and the second metal pad 212 may be a square wave pulse, such as a square wave step signal, and the pulse signal may be a current signal or a voltage signal. By applying the square wave pulse to the excitation TSV pair 203, the grounding response signal of the substrate 210 in each testing region may be measured to determine the noise level and the distribution of the noise of the substrate.

In some embodiments, the pulse signal may be generated by a waveform generator, and due to small resistances of the first excitation TSV 201 and the second excitation TSV 202, a current limiting resistor may be appropriately connected in series in an excitation circuit to avoid an excessive current. A resistance range of the current limiting resistor may be determined based on actual needs. For example, the resistance range of the current limiting resistor may be several hundred to several thousand ohms (e.g., $100\Omega$~$8000\Omega$), etc.

In some embodiments, if a pulse voltage is designated as the pulse signal, an amplitude range of the pulse voltage may ne 0.1~5 V, and a frequency range of the pulse voltage may be 10~500 MHz, which may not be limited herein. For example, an amplitude of the pulse voltage may be 1-3 V, and a corresponding frequency of the pulse voltage may be 100-1 kHz. As another example, the amplitude of the pulse voltage may be 0.2-1.25 V, and the corresponding frequency may be 1 k-10 kHz. Alternatively, the amplitude of the pulse voltage may also be 1.8-3.5 V, and the corresponding frequency may be 10-1 kHz.

In some embodiments, in addition to a square wave pulse signal, the pulse signal applied to the two ends of the excitation TSV pair 203 may also be a sinusoidal pulse signal, a triangular pulse signal, etc. However, when analyzing the noise burr signal to obtain a noise burr, the square wave pulse signal may be better to obtain an effective noise burr in a testing region compared to a sinusoidal pulse signal or a triangular pulse signal.

In some embodiments, a processor may measure the grounding response signal based on an oscilloscope. Specifically, when performing a noise testing on the substrate, the processor may apply the pulse signal to both ends of the excitation TSV pair 203 based on the first metal pad 211 and the second metal pad 212. At the same time, the metal pad 213 of the testing region and the metal pad 213 of the grounding TSV may be connected with the oscilloscope, and the oscilloscope may be used to measure the grounding disturbance signal of the testing region to obtain the noise of the substrate caused by the excitation TSV pair 203.

In some embodiments, when performing the noise testing on the substrate, the processor may connect a signal amplifier between the metal pads 211 and 212 of the testing region and the oscilloscope, and connect another signal amplifier between the metal pad 213 of the grounding TSV and the oscilloscope, to amplify a detected grounding response signal. The signal amplifiers may be preamplifiers, and the amplification factor of one of the signal amplifiers may be $10^4$~$10^6$.

In some embodiments of the present disclosure, due to a small amplitude of the noise burr signal of the metal pads in the testing region and the grounding TSV 2061, connecting the signal amplifiers to amplify a detected voltage signal may facilitate the oscilloscope to recognize the voltage signal. In this way, the grounding response signal of the testing region read on the oscilloscope may be clearer and more accurate, thereby making the obtained noise of the substrate caused by the excitation TSVs more accurate and effective.

Figure 4:
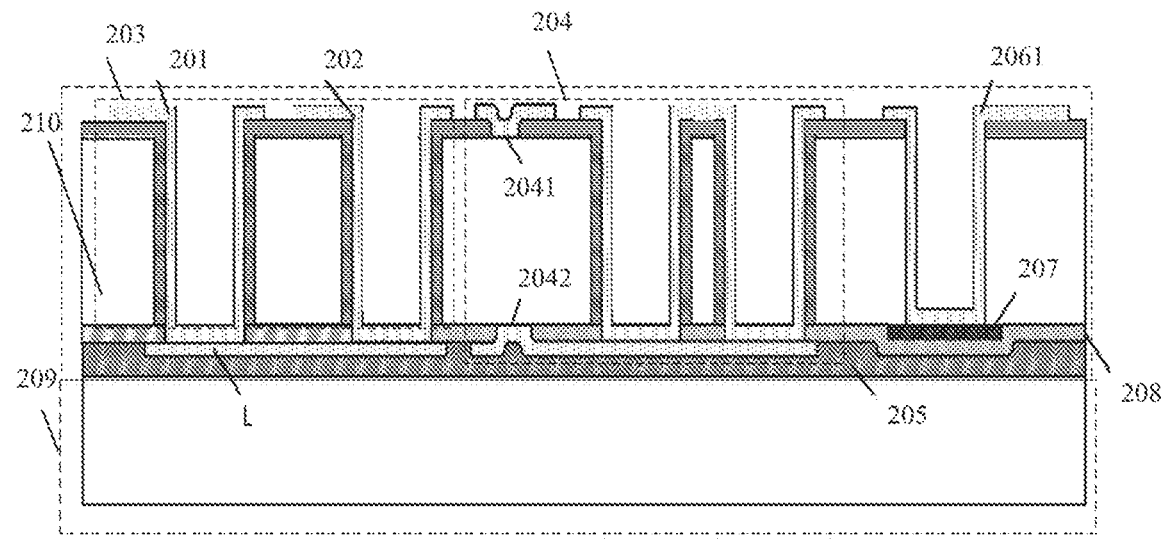
FIG. 4 is another schematic diagram illustrating an exemplary device for noise testing of a substrate including TSVs according to some embodiments of the present disclosure.

FIG. 4 is another schematic diagram illustrating an exemplary device for noise testing of a substrate including TSVs according to some embodiments of the present disclosure.

The device for noise testing of a substrate including TSVs in FIG. 4 is consistent with the device for noise testing of a substrate including TSVs in FIG. 2, but an arrangement of the one or more testing regions is different from an arrangement of the one or more testing regions in FIG. 2. On the basis of the above embodiments, the one or more testing regions may be further described in FIG. 4.

In some embodiments, the one or more testing regions 204 of the testing link may include a first testing region and/or a second testing region. In some embodiments, the first testing region may include a first contacting region 2041 and a first testing interface electrically connected with the first contacting region 2041, and the first contacting region 2041 may be in contact with the substrate 210 on a first side of the substrate 210. In some embodiments, the second testing region may include a second contacting region 2042 and a second testing interface electrically connected with the second contacting region 2042, and the second contacting region 2042 may be in contact with the substrate 210 on a second side of the substrate 210. The first side and the second side of the substrate 210 may be two sides perpendicular to an axial direction of a TSV among first TSVs, at least two groups of second TSVs, and at least one group of third TSVs on the substrate 210. Specifically, the first side of the substrate 210 may be the top surface of the substrate 210, and the second side of the substrate 210 may be the bottom surface of the substrate 210.

Figure 8:
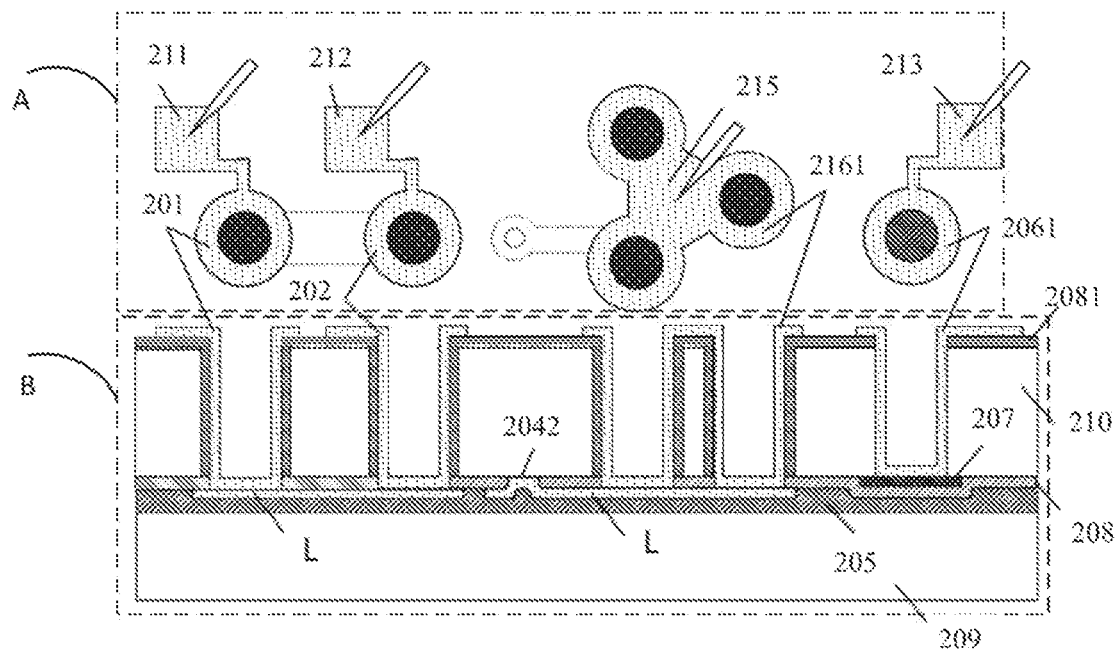
FIG. 8 is another schematic diagram illustrating an exemplary device for noise testing of a substrate including TSVs according to some embodiments of the present disclosure.

In some embodiments, the one or more testing regions 204 may merely include one of the first testing region and the second testing region, which may be shown in FIG. 8.

In some embodiments, as shown in FIG. 4, each group of one or more groups of testing regions may include the first contacting region 2041 and the second contacting region 2042. The first contacting region 2041 may be arranged on the first side of the substrate 210 to measure a grounding response signal of the substrate 210 on the first side, and the second contacting region 2042 may be arranged on the second side of the substrate 210 corresponding to the first contacting region 2041 to measure the grounding response signal of the substrate 210 on the second side.

The first contacting region 2041 and the second contacting region 2042 may be contacting regions for measuring the ground response signals, respectively. The first testing interface and the second testing interface may be used to connect a device for detecting disturbance signals, respectively. In some embodiments, the first testing interface and the second testing interface may be metal pads.

In some embodiments, each group of the one or more groups of testing regions may merely include one of the first testing region and the second testing region, or may include both the first testing region and the second testing region. The first contacting region 2041 in the first testing region may refer to a test contacting region that tests a noise of the substrate caused by the excitation TSV from the first side of the substrate 210. Thus, the first contacting region 2041 may be arranged on the first side of the substrate 210, and may be arranged within a preset range around the excitation TSV pair 203. The second contacting region 2042 in the second testing region may refer to a test contacting region that tests a noise of the substrate caused by the excitation TSV from the second side of the substrate 210. Thus, the second contacting region 2042 may be arranged at a position corresponding to the first contacting region 2041 on the second side of the substrate 210.

In some embodiments, a preparation process of the first contacting region 2041 and the second contacting region 2042 may include: after depositing an insulation layer 208 on the substrate 210, etching the second contacting region 2042 on the insulation layer 208, and then etching the first contacting region 2041 in a region adjacent to the excitation TSV 203 on an top surface (i.e., the first side) of the substrate 210 corresponding to a position of the second contacting region 2042.

In the embodiment of this specification, by the arrangement of the first contacting region 2041 and the second contacting region 2042, grounding response signals (e.g., noise burr signals) may be measured on the first side and the second side of the substrate 210, respectively, and the measured signals may be compared to locate an approximate position with an insulation energy reduction in the excitation TSV pair 203 due to process operations, thus achieving a function of the auxiliary failure localization.

Figure 5:
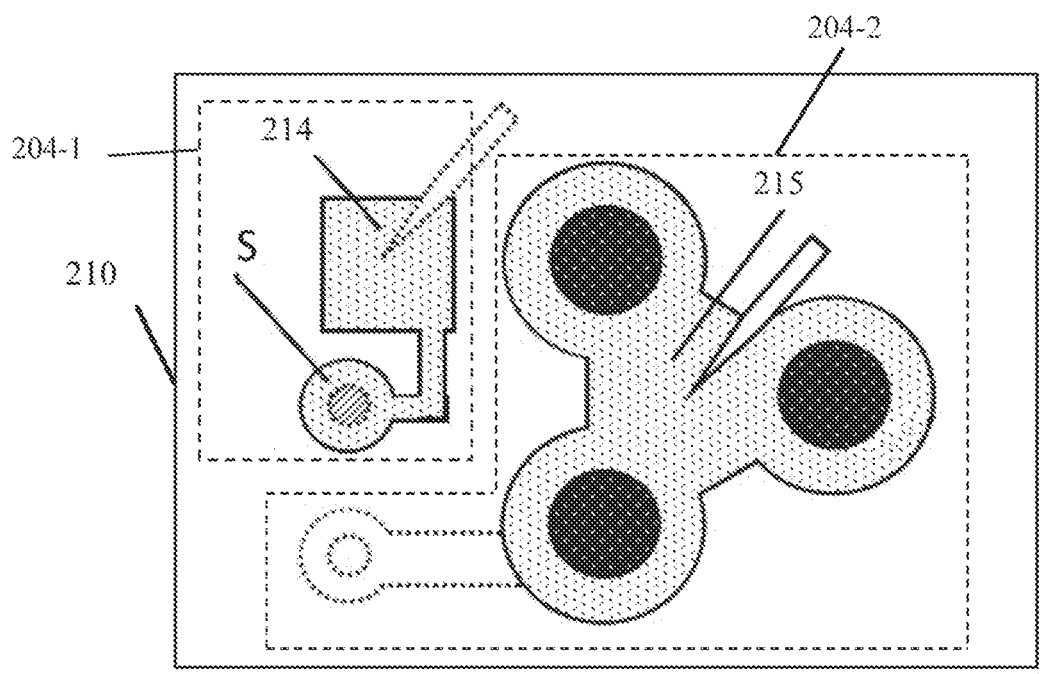
FIG. 5 is another schematic diagram illustrating an exemplary device for noise testing of a substrate including TSVs according to some embodiments of the present disclosure.

FIG. 5 is another schematic diagram illustrating an exemplary device for noise testing of a substrate including TSVs according to some embodiments of the present disclosure.

As mentioned above, a contacting region in each group of testing regions of one or more groups of testing regions may be connected with a testing interface (e.g., a metal pad) by providing an extended electrode. In some embodiments, as shown in FIG. 5, the contacting region of a testing region illustrated from a top view of the device of noise testing may also be connected with the testing interface (e.g., a metal pad) by providing a metal extended electrode. Specifically, in combination of FIGS. 4 and 5, the first testing region 204-1 may include the first contacting region 2041 and the first testing interface (i.e., a third metal pad 214), and the first contacting region 2041 may be connected with the first testing interface (i.e., the third metal pad 214) based on a metal extended electrode S. The second testing region 204-2 may include the second contacting region 2042 and the second testing interface (i.e., a fourth metal pad 215), and the second contacting region 2042 may be connected with the second testing interface (i.e., the fourth metal pad 215) based on the metal extended electrode S. Thus, a grounding noise of the first side of the substrate 210 may be measured in the first contacting region 2041 based on the third metal pad 214, and a grounding noise of the second side of the substrate 210 may be measured in the second contacting region 2042 based on the fourth metal pad 215.

In some embodiments, when preparing the device of noise testing, the third metal pad 214 and the fourth metal pad 215 may also be connected into a metal pad by the extended electrode. For example, connecting the first contacting region 2041 on the fourth metal pad 215 based on a connection of the extended electrode, two contacting regions (i.e., the first contacting region and the second contacting region) may be measured by using the same metal pad, achieving a synchronous measurement of grounding noises in the first side and the second side.

In some embodiments of the present disclosure, a noise signal may be monitored from the first side, the second side, respectively, or may be simultaneously monitored from the first side and the second side of the substrate 210, thus to obtain the noise situation of the substrate at different position around the excitation TSV pair 203. Testing the grounding noise of the substrate from multiple dimensions may improve the accuracy and effectiveness of testing the noise of the substrate caused by the excitation TSV.

In addition, as shown in FIG. 5, three TSVs may be prepared around the one or more testing regions, and the structure formed by these three TSVs may be called a TSV cluster. More descriptions for the TSV cluster may be found elsewhere in the present disclosure, for example, FIG. 6 and the relevant descriptions.

Figure 6:
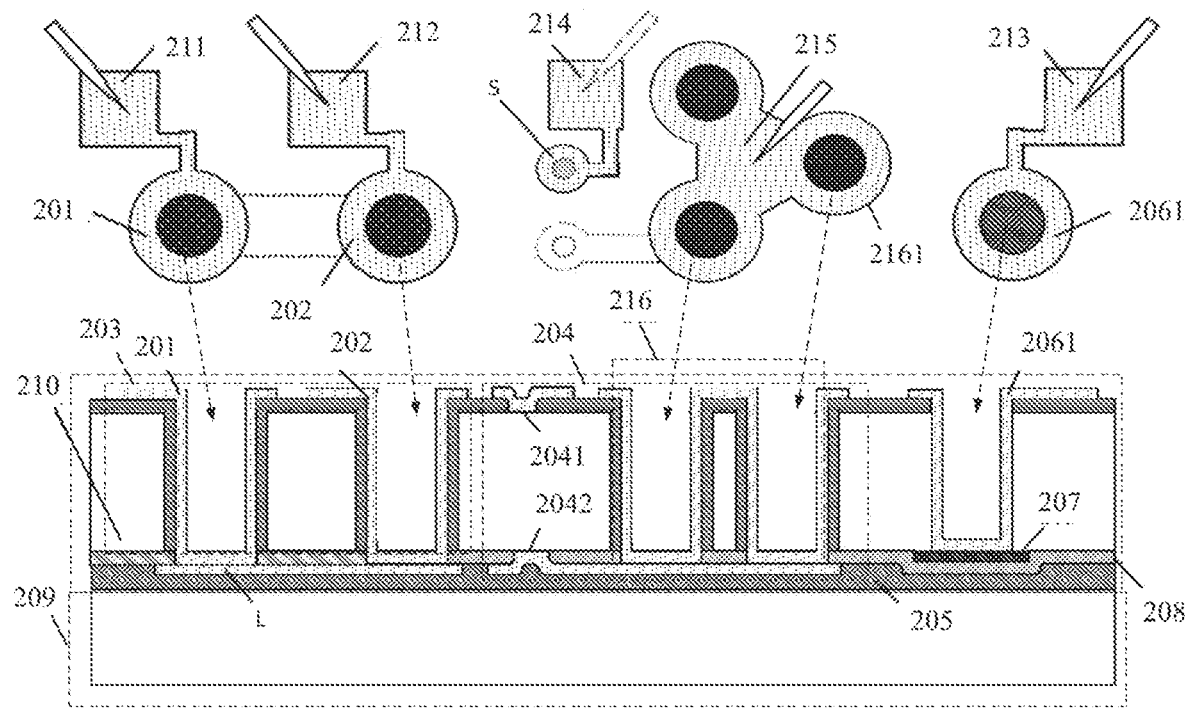
FIG. 6 is another schematic diagram illustrating an exemplary device for noise testing of a substrate including TSVs according to some embodiments of the present disclosure.

FIG. 6 is another schematic diagram illustrating an exemplary device for noise testing of a substrate including TSVs according to some embodiments of the present disclosure.

FIG. 6 is a schematic diagram of a combination of a side view and a vertical view of the device for noise testing of a substrate including TSVs according to some embodiments of the present disclosure. Structures of the device shown in FIG. 6 may be the same as or similar to the structures of the device shown in FIG. 2. Based on the above embodiments, a TSV cluster may be further described in the following descriptions.

In some embodiments, the at least one group of third TSVs of the testing link may further include at least one TSV cluster 216. The second contacting region may be electrically connected with the second testing interface through at least one TSV cluster. More descriptions for the second contacting region and the second testing interface may be found elsewhere in the present disclosure, for example, FIG. 4, and the relevant descriptions.

A TSV cluster is a group of TSVs composed of a plurality of TSVs. In some embodiments, one of at least one TSV cluster may include at least two TSVs in a parallel connection. For example, a TSV cluster may include three TSVs in a parallel connection. In some embodiments, the at least two TSVs in the parallel connection may be electrically connected on a first side and a second side of a substrate, respectively. For example, the at least two TSVs in the parallel connection may be connected with the first side and the second side of the substrate 210 based on extended electrodes, respectively.

In some embodiments of the present disclosure, the at least one TSV cluster in the testing link may connect the second contacting region with the second testing interface to facilitate the detection of the grounding response signal of the second contacting region based on the second testing interface.

The device shown in FIG. 6 may further include the at least one TSV cluster 216 on the first side of the substrate 210, and one of the at least one TSV cluster 216 may include at least two TSVs 2161 in a parallel connection. The top of at least two TSVs 2161 may be connected with the second contacting region 2042 based on a metal extended electrode on the first side of the substrate 210, and the bottom of at least two TSVs 2161 may be connected with the second contacting region 2042 based on the metal extended electrode on the second side of the substrate 210.

In some embodiments, the device may include one or more TSV clusters 216, each of the one or more TSV clusters 216 may include two or more TSVs 2161 in a parallel combination. For example, the one or more TSV clusters 216 may include three TSVs in the parallel combination (taking three TSVs in the parallel combination shown in FIGS. 4 and 5 as examples), or the one or more TSV clusters 216 may include four or five TSVs in the parallel combination, etc.

For one of the one or more TSV clusters 216, the top of all TSVs 2161 may be connected with a fourth metal pad 215 based on an RDL metal extended electrodes on the first side of the substrate 210, and the bottom of all TSVs 2161 may be connected with the second contacting region 2042 based on the RDL metal extended electrode on the second side of the substrate 210.

In some embodiments, the at least two TSVs in the parallel combination may be electrically connected with the second testing interface on the first side of the substrate 210.

In some embodiments, a signal from the second testing region may be transmitted to the first side for a noise testing based on an electrical connection between the at least two TSVs and the second testing interface on the first side.

In some embodiments, an electrical connection may not exist between the first side and at least one TSV cluster. In this case, the at least one TSV cluster may merely be electrically connected with the second contacting region 2042 and the second testing interface, and signals transmitted in the at least one TSV cluster may all be response signals of the second contacting region 2042, and may not be affected by response signals of the first contacting region 2041.

For example, taking a TSV cluster 216 including two TSVs 2161 in the parallel combination as an example, the top of the two TSVs 2161 may be connected with a fourth metal pad 215 based on a metal extended electrode, and the bottom of the two TSVs 2161 may be connected with the second contacting region 2042 based on the metal extended electrode. The grounding TSV 2061 may be connected with the metal pad 213 of the grounding TSV based on the metal extended electrode. Therefore, the fourth metal pad 215 and the metal pad 213 of the grounding TSV may measure the grounding response signal of the second contacting region 2042 when a square wave pulse passing through the excitation TSV pair 203. More descriptions for measuring the grounding response signal of the second contacting region 2042 may be found elsewhere in the present disclosure, for example, FIG. 8 and the relevant descriptions.

For example, the first contacting region 2041 may be connected with the third metal pad 214 arranged on the first side of the substrate 210 based on a metal extended electrode. The metal pad 214 and the metal pad 213 of the grounding TSV may measure the grounding response signal of the first contacting region 2041 when a square wave pulse passing through the excitation TSV 203.

For example, the first contacting region 2041 may also be connected with the fourth metal pad 215 based on the metal extended electrode, that is, the first contacting region 2041 and the second contacting region 2042 may be connected. Thus, a common grounding response signal of the first contacting region 2041 and the second contacting region 2042 may be measured based on the fourth metal pad 215 and the metal pad 213 of grounding TSV when a square wave pulse passing through the excitation TSV pair 203. More descriptions for measuring the common grounding response signal may be found elsewhere in the present disclosure, for example, FIG. 9, and the relevant descriptions.

The square wave pulse of the above-mentioned excitation TSV pair 203 may be achieved by applying a pulse signal at both ends of the excitation TSV pair 203 based on the first metal pad 211 and the second metal pad 212.

Furthermore, taking the signal amplifier in the above-mentioned embodiment as an example, the signal amplifier may be connected in a behind position of the third metal pad 214, the fourth metal pad 215, and the metal pad 213 of the grounding TSV. Thus, the grounding response signal of the first contacting region 2041 and/or the second contacting region 2042 may be amplified. It can be understood that each metal pad is used to measure a grounding response signal in different testing regions. Connecting the signal amplifier behind the metal pads may not only amplify the measured grounding response pulse signals, but also save the hardware resources.

It should be noted that in some embodiments of the present disclosure, a distance between the extended electrode of the testing region and the extended electrode of the excitation TSV may be determined based on layout design requirements of an active area of the chip. For example, the distance may be in the range of 20~300 um, which may not be limited herein.

Figure 7:
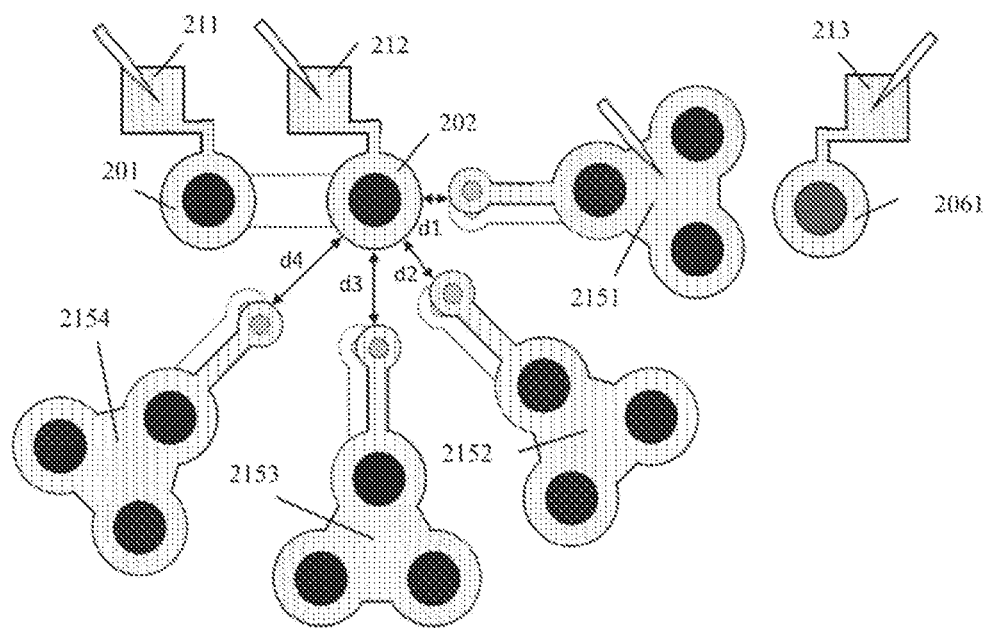
FIG. 7 is another schematic diagram illustrating an exemplary device for noise testing of a substrate including TSVs according to some embodiments of the present disclosure.

FIG. 7 is another schematic diagram illustrating an exemplary device for noise testing of a substrate including TSVs according to some embodiments of the present disclosure.

In some embodiments, at least one group of third TSVs may include a plurality of TSV clusters, and a distance between a center position of a first side of one of the plurality of TSV clusters and a TSV of at least two group of second TSVs of the excitation link may be different from a distance between a center position of a first side of another one of the plurality of TSV clusters and the TSV.

As shown in FIG. 7, in some embodiments, the plurality of TSV clusters may be arranged at different positions on the first side of the substrate 210, and distances d from reference positions (e.g., center positions, edge positions, etc.) of first sides of the plurality of TSV clusters on the first side of the substrate 210 to a TSV of the excitation TSV pair 203 may be different. As used herein, one TSV cluster may be considered as a whole, and a first side of the TSV cluster refers to a side of a virtual frame (e.g., a rectangle frame) enclosing the TSV cluster. In some embodiments, the distances d from edge positions of first sides of the plurality of TSV clusters on the first side of the substrate 210 to the TSV of the excitation TSV pair 203 may be in an increasing trend.

In some embodiments, the distances d from the reference positions of first sides of the plurality of TSV clusters 6 on the first side of the substrate 210 to the TSV of the excitation TSV pair 203 may gradually increase in a reference direction. The reference direction may be a clockwise direction or a counterclockwise direction. As shown in FIG. 7, the device includes four TSV clusters. The distances from the reference positions of first sides of the plurality of TSV clusters on the first side of the substrate 210 to a TSV of the excitation TSV pair 203 are d1, d2, d3, and d4, respectively, and values of d1, d2, d3, and d4 may gradually increase. In the device of noise testing, four TSV clusters and grounding TSV 2061 may be formed by electrically connected excitation TSV pairs 203, four groups of testing regions.

In some embodiments of the present disclosure, by providing a plurality of TSV clusters with different distances from the TSV of the excitation TSV pair 203, grounding disturbance signals of different testing regions may be divided into groups to be measured, thereby obtaining a plurality of groups of testing data, further obtaining a correlation between the noise of the substrate and distances each of which is between a center position of a first side of one cluster of a plurality of TSV clusters and a TSV of the at least two groups of second TSVs, and determining the noise level and distribution of the noise of the substrate to ensure the accuracy and effectiveness of the noise of the substrate.

In some embodiments, at least one group of third TSVs may include the plurality of TSV clusters, and the plurality of TSV clusters may be distributed surrounding at least one TSV of the at least two groups of second TSVs of the excitation link. As shown in FIG. 7, the plurality of TSV clusters are distributed surrounding the second excitation TSV 202 of the excitation TSV pair 203, and distances each of which is between one of the center positions of the first sides of the plurality of TSV clusters and the second excitation TSV 202 may be different. In some embodiments, a count of the plurality of TSV clusters may be 2-5.

A surrounding distribution of the plurality of TSV clusters may measure the grounding response signals in different directions around the excitation TSV pair 203 in a plane perpendicular to the axial direction of a TSV among the first TSVs, the at least two groups of second TSVs, and the at least one group of third TSVs. At the same time, the structures of the device may be more compact, and the distances may be provided more flexibly.

In some embodiments, distribution of a portion of the plurality of TSV clusters may be a ring, thus a plurality of TSV clusters may form a plurality of rings, and a portion of the plurality of TSV clusters may be distributed on each of the plurality of rings. A circle center of the plurality of ring may be a TSV of the excitation link. Specifically, radiuses of the plurality of rings each of which is composed of TSV clusters may be different, and distances between TSV clusters on the same ring and a TSV of the excitation TSV pair 203 may be the same. In some embodiments, a count of TSV clusters arranged on the same ring may be 2-5.

In some embodiment of the present disclosure, by providing rings with different radiuses and the portion of the plurality of TSV clusters distributed on the rings, the noise level in different directions in the plane perpendicular to the axis of the TSV may be measured by the distances. Furthermore, the distributions of noise in different positions and directions may be measured. For example, if noise of the portion of the plurality of TSV clusters in different directions on the same ring are different, defects on the different direction may be determined based on the detected noise. For example, noise contour lines may be drawn based on a detection result of the noise to intuitively show a distribution pattern of the noise, thereby the distribution of the noise of the substrate may be determined.

When performing noise testing on the substrate, taking a pulse voltage with an amplitude of 1.8~3.5 V and a frequency of 10~1 kHz as an example, a square wave or a pulse voltage (current) signal may be applied to both ends of the TSV pair 203 based on the first metal pad 211 and the second metal pad 212, while the grounding disturbance signal of different testing regions may be divided into groups to be measured based on the metal pad 2151, the metal pad 2152, the metal pad 2153, the metal pad 2154 and the metal pad 213 of the grounding TSV, thus obtaining a plurality of testing data. By obtaining the plurality of testing data, a correlation between the noise of the substrate and distances each of which is between a center position of a first side of one cluster of a plurality of TSV clusters and a TSV of the at least two groups of second TSVs may be further obtained, and the noise of the substrate may be determined based on the correlation. By using the plurality of testing data to obtain substrate noise, the accuracy and efficiency of the obtained noise may be further guaranteed.

In some embodiments, within a preset distance range, the shorter the distance between a center position of a first side of one of the plurality of TSV clusters and the TSV of the at least two groups of second TSVs of the excitation link is, the larger the grounding response signal detected in a corresponding testing region is, and the greater the distance between a center position of a first side of one of the plurality of TSV clusters and the TSV of the at least two groups of second TSVs of the excitation link is, the smaller the grounding response signal detected in a corresponding testing region is. A processor may determine the preset distance range in advance based on actual needs.

It should be noted that in the device shown in the above embodiments, a count of testing regions, the count of the plurality of TSV clusters, and a count of TSVs in a TSV cluster may be adjusted based on actual applications, which may not be limited herein. It can be understood that although the more the count of testing regions, the count of TSV clusters, and the count of TSVs in the TSV cluster are, the more accurate the calculation result is, but a greater count of testing regions, the greater count of TSV clusters, and the greater count of TSVs in the TSV cluster may occupy a larger chip area. Therefore, considering the accuracy of the noise of the substrate and chip area, the count of TSVs in the TSV cluster may be 3-4.

FIG. 8 is another schematic diagram illustrating an exemplary device for noise testing of a substrate including TSVs according to some embodiments of the present disclosure.

As shown in FIG. 8, a region A is a vertical view of the device for noise testing of a substrate including TSVs viewed from a first side of the substrate 210, and shows metal pads and a plurality of TSVs. The plurality of TSVs may include a first excitation TSV 201, a second excitation TSV 202, a plurality of TSVs 2161 in a TSV cluster 216, and a grounding TSV 2061. A region B shown in FIG. 8 is a side view of the device including an internal metal extended electrode, a second contacting region 2042, and visible structures inside an adhesive layer 205. As shown in FIG. 8, the various structures in the region A and the region B are labeled.

In the device, an etching barrier layer 207 of the grounding TSV 2061 may be arranged on a second side of the substrate 210, and an insulation layer 208 may be deposited. Then, the second contacting region 2042 may be etched on the insulation layer 208, and a bottom extended electrode L of the excitation TSV pair 203 and the metal extended electrode of the second contacting region area 2042 may be prepared. A material for etching the etching barrier layer 207 may be amorphous silicon.

Specifically, the first side of the substrate 210 may be thinned and polished to a thickness of 10-300 μm. A deep-silicon etching may be performed to prepare TSVs (all TSVs of the device), and then the insulation layer 2081 may be deposited on the bottom and sidewall of the TSVs, and surface of the substrate 210. The insulation layer 2081 arranged at the bottom and sidewall of the grounding TSV 2061 may be removed based on a wet etching, and the insulation layer 2081 arranged at the bottom of other TSVs (other TSVs except for the grounding TSV 2061 in the device) may be removed based on a dry etching, while the insulation layer 2081 arranged at the sidewall of the other TSVs may be remained. Finally, metal layers inside all TSVs and a metal layer on a surface of substrate 210 may be deposited, and metal extended electrodes and metal pads may be provided.

The metal extended electrode of the excitation TSV pair 203 may be in an electrical connection based on an RDL metal electrode L provided under the insulation layer, and the sidewall of the grounding TSV 2061 may contact the entire substrate 210 in a deep direction of the substrate 210, thereby achieving a complete grounding of the grounding TSV 2061.

In some embodiments of the present disclosure, the TSV cluster 216 may be composed of three TSVs 2161 in a parallel combination, the top of the three TSVs 2161 may be connected with each other based on the RDL metal extended electrode and the bottom of the three TSVs 2161 may be connected with the second contacting region 2042 adjacent to the excitation TSV pair 203 based on the RDL metal extended electrode. A distance between the second contacting region 2042 and the extended electrode of one TSV of the excitation TSV pair may be determined based on layout design requirements of an active area of a chip.

When performing a noise testing, a square wave or a pulse voltage (current) signal may be applied at both ends of the excitation TSVs 201 and 202 based on the first metal pad 211 and the second metal pad 212. Then, the fourth metal pad 215 of the second contacting region 2042 and the metal pad 213 of the grounding TSV may be connected with an oscilloscope to measure a grounding disturbance signal of the second contacting region 2042. An amplitude of the pulse voltage may be 1-3 V and a frequency of the pulse voltage may be 100 Hz-500 MHz.

In some embodiments of the present disclosure, the second contacting region 2042 of the device may be taken as an example, that is, in the device in some embodiments of the present disclosure, after applying a square wave signal at both ends of the first excitation TSV 201 and the second excitation TSV 202, the grounding disturbance signal of the second contacting region 2042 may be obtained by measuring the fourth metal pad 215 of the second contacting region 2042 and the metal pad 213 of the grounding TSV, and a noise level and a distribution of the noise of the substrate may be determined based on the grounding disturbance signal of the second contacting region 2042.

Figure 9:
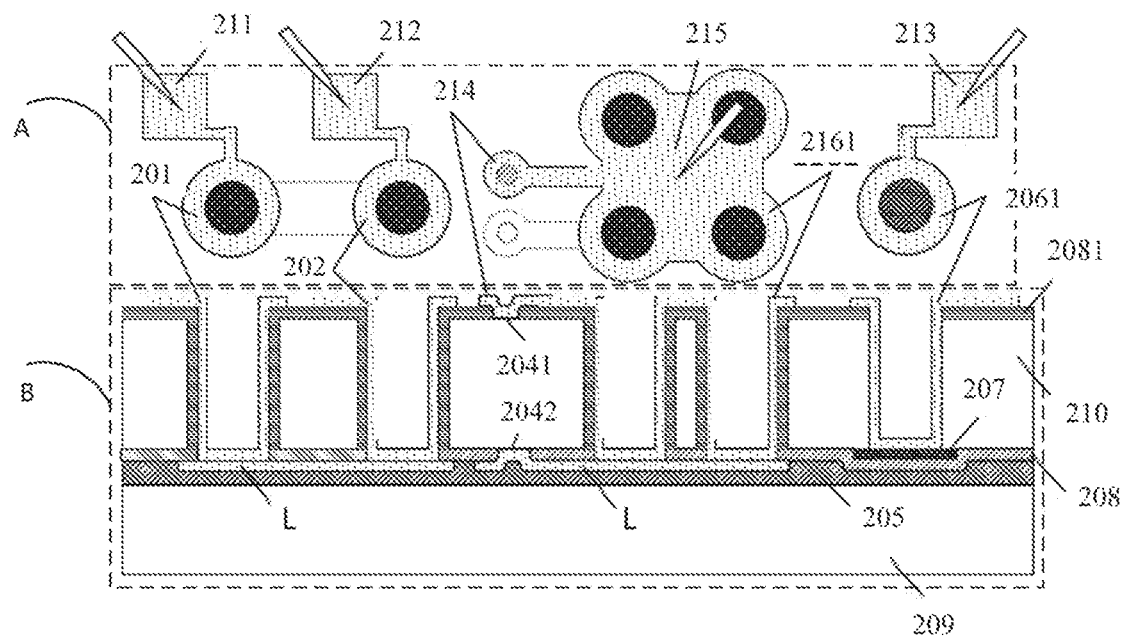
FIG. 9 is another schematic diagram illustrating an exemplary device for noise testing of a substrate including TSVs according to some embodiments of the present disclosure.

FIG. 9 is another schematic diagram illustrating an exemplary device for noise testing of a substrate including TSVs according to some embodiments of the present disclosure.

In some embodiments, a first contacting region 2041 may be electrically connected with at least one TSV cluster on a first side of a substrate, and a first testing interface and a second testing interface may be the same testing interface. Specifically, an extended electrode of the first contacting region 2041 may be connected with the second contacting region 2042, and the first contacting region 2041 and the first contacting region 2042 may share a metal pad, thus enabling a synchronous testing of the first contacting region 2041 and the second contacting region 2042, which may obtain a common grounding disturbance signal and determine a noise level and a distribution of a noise of the substrate based on the common grounding disturbance signal.

As shown in FIG. 9, differ from FIG. 8, the first contacting region 2041 and the second contacting region 2042 may share the same testing interface. The TSV cluster 216 may include four TSVs 2161 in a parallel combination, the top of the four TSVs may be connected with the first contacting region 2041 based on an RDL metal extended electrode 2, and the bottom of the four TSVs may be connected with the second contacting region 2042 adjacent to an excitation TSV based on the RDL metal extended electrode. Distances between the extended electrodes of the second contacting region 2042 and the first contacting region 2041 and the extended electrodes of a TSV of the excitation TSV pair 203 may be determined based on layout design requirements of an active area of a chip.

When performing a noise testing on the substrate, a square wave or pulse voltage (current) signal may be applied at both ends of the excitation TSVs 201 and 202 based on the metal pads 211 and 212, and a preamplifier may be connected with the fourth metal pad 215 and the metal pad 213 of the grounding TSV, and then may be connected with an input terminal of an oscilloscope to measure a common grounding disturbance signal of the second contacting region 2042 and the first contacting region 2041. An amplitude of the pulse voltage may be 0.2-1.25 V, and a frequency of the pulse voltage may be 1 k-10 kHz, and an amplification factor of the preamplifier may be $10^4$~$10^6$.

The device described in the embodiments of the present disclosure may include the second contacting region 2042 and the first contacting region 2041. In the device, after applying a square wave signal at both ends of the first excitation TSV 201 and the second excitation TSV 202, the extended electrode of the first contacting region 2041 may be connected with the second contacting region 2042, and the first contacting region 2041 and the second contacting region 2042 may share the fourth metal solder pad 214. In this way, by measuring the fourth metal pad 215 and the metal pad 213 of the grounding TSV, the common grounding disturbance signal of the first contacting region 2041 and the second contacting region 2042 may be obtained, and the noise level and the distribution of the noise of the substrate may be determined based on the common grounding disturbance signal.

FIG. 10 is a flowchart illustrating an exemplary process of a method implemented on a device including a substrate including first TSVs for noise testing of the substrate according to some embodiments of the present disclosure. As shown in FIG. 10, process 1000 may including the following operations. In some embodiments, process 100 may be implemented by a processor.

In 1010, a pulse signal may be applied to an excitation link. The excitation link may include at least two groups of second TSVs arranged on a substrate, and an insulation layer may be arranged between the excitation link and the substrate. In some embodiments, operation 1010 may be executed by the processor.

More information for the excitation link may be found elsewhere in the present disclosure, for example. FIGS. 1-9 and the relevant descriptions.

When the pulse signal passing through the excitation link, there may be a certain upper limit of an insulation feature of a sidewall of at least two groups of second TSVs, thus a corresponding noise disturbance may be generated on the substrate. The noise disturbance generated on the substrate may be detected in a neighbor region of the excitation link. Therefore, the excitation link may be provided to detect a grounding response signal of the neighbor region when the pulse signal passing through the excitation link, thereby obtaining the noise of the substrate.

The substrate may be a wafer made of semiconductor single crystal, and may be the main substrate of a TSV. In some embodiments, the first TSVs may be formed on the substrate, and the insulation layer may be provided between the excitation link and the substrate to electrically isolate the excitation link from the substrate. More descriptions for the substrate may be found elsewhere in the present disclosure, for example. FIGS. 1-9 and the relevant descriptions.

In some embodiments, the processor may apply the pulse signal to an excitation TSV pair based on a first interface end (e.g., a first metal pad) connected with a first excitation TSV and a second interface end (e.g., a second metal pad) connected with a second excitation TSV. A metal pad may be connected with a corresponding TSV based on an extended lead. For example, the first excitation TSV may be connected with the first metal pad based on an extended lead, and the second excitation TSV may be connected with the second metal pad based on the extended lead.

In some embodiments, the pulse signal may be a square wave pulse, such as a square wave step signal, and the pulse signal may be either a current signal or a voltage signal. In some embodiments, the pulse signal may also be a sine pulse signal, a triangular pulse signal, etc. In some embodiments, the pulse signal may be generated based on a waveform generator. More descriptions for the pulse signal may be found elsewhere in the present disclosure, for example. FIG. 3 and the relevant descriptions.

In 1020, one or more response signals in a testing link may be obtained. The testing link may include at least one group of third TSVs, and the testing link may be electrically connected with the substrate. In some embodiments, operation 1020 may be executed by the processor.

The one or more response signals may be one or more grounding response signal of neighbor region of the excitation link obtained when the pulse signal passing through the excitation link. In some embodiments, the one or more response signals may be obtained based on the testing link.

The testing link may be a structure used to detect a grounding disturbance signal of the substrate. In some embodiments, the testing link may include at least one group of third TSVs, and the testing link may be electrically connected with the substrate. The one or more response signals obtained from different structures of the testing link may be different. More descriptions for the testing link may be found elsewhere in the present disclosure, for example. FIGS. 1-9 and the relevant descriptions.

In some embodiments, the testing link may include one or more testing regions and a grounding region, and the one or more testing regions may be electrically connected with the grounding region based on the substrate. The at least one group of third TSVs may include a grounding TSV, and the grounding region may be arranged at the grounding TSV. Due to the grounding TSV being grounded, the one or more response signals obtained based on the one or more testing regions may be the grounding response signals of the one or more testing regions relative to the grounding region. More descriptions for the testing region and the grounding region may be found elsewhere in the present disclosure, for example. FIG. 2 and the relevant descriptions.

In 1030, a noise level and a distribution of a noise of the substrate may be determined based on the one or more response signals.

In some embodiments, based on the one or more response signals, amplitudes and integral areas of the one or more response signals may be determined, and used to analyze the noise burr signal to determine the noise level and an action period or time of the noise of the substrate generated by the excitation TSV pair.

In some embodiments, the one or more testing regions may include a first testing region and a second testing region. The first testing region may include a first contacting region, which may contact the substrate on a first side of the substrate. The second testing region may include a second contacting region, which may contact the substrate on a second side of the substrate. The one or more response signals may include a first response signal of the first testing region and a second response signal of the second testing region. The first response signal may be a grounding response signal obtained from the first testing region, and the second response signal may be a grounding response signal obtained from the second testing region. More descriptions for the first testing region and the second testing region may be found elsewhere in the present disclosure, for example. FIG. 4 and the relevant descriptions.

In some embodiments, the processor may determine a first noise based on the first response signal of the first testing region, and a second noise based on the second response signal of the second testing region. In some embodiments, the processor may determine a distribution of defects on the substrate along an axial direction of a TSV among the at least two groups of second TSVs and the at least one groups of third TSVs based on the first noise and the second noise. The defects on the substrate may decreases of the insulation performance at different positions on the substrate, and the distribution of the defects on the substrate may be along the axial direction of a TSV, that is, the defects may be near the first or second side. Merely by way of example, the insulation performance of a certain position on the substrate may decrease due to an over etching. If the defects on the substrate are located near the second side of the substrate, an amplitude of a grounding disturbance signal of the noise of the second side of the substrate may be greater than an amplitude of a grounding disturbance signal of the noise of the first side of the substrate.

The processor may obtain a grounding disturbance signal (i.e., the first noise and the second noise) by connecting the first response signal and second response signal to an oscilloscope. The processor may determine a vertical noise distribution of an excitation TSV of the at least two groups of second TSVs that a distance from the excitation TSV to a front surface of the substrate is the same as a distance from the excitation TSV to a back surface of the substrate.

Since the first contacting region is arranged on the first side of the substrate, and the second contacting region is arranged on the second side of the substrate, the grounding response signals of corresponding regions of the first side and the second side may be measured simultaneously. By comparing a first response signal and a second response signal obtained from the first side and the second side, an approximate location with the insulation performance reduction caused by a process operation in the neighbor region of the excitation TSV pair 203 may be roughly positioned, which may assist in failure localization.

In some embodiments, at least one group of third TSVs may also include a plurality of TSV clusters, and the one or more testing regions may include a plurality of testing positions corresponding to the plurality of TSV clusters, and a distance between a center position of a first side of one of the plurality of TSV clusters and a TSV of the at least two group of second TSVs of the excitation link is different from a distance between a center position of a first side of another one of the at least one TSV cluster and the TSV. More descriptions for the TSV clusters may be found elsewhere in the present disclosure, for example, FIGS. 6 and 7, and the relevant descriptions. Each of the plurality of TSV clusters may be arranged with a corresponding testing position. By measuring the corresponding testing position of a TSV cluster, a response signal corresponding to each testing position may be obtained. In some embodiments, a plurality of test interfaces may be electrically connected at the plurality of testing positions to obtain a plurality of response signals from the plurality of testing positions based on the plurality of testing interfaces. Due to a plurality of distances between center positions of first sides of the plurality of TSV clusters and the TSV being different, the plurality of response signals obtained from the plurality of testing positions corresponding to the plurality of TSV clusters may also be different.

In some embodiments, the processor may determine a correlation (e.g., a functional relationship) between the noise of the substrate and the plurality of distances based on the plurality of response signals. In some embodiments, the shorter the distance between a center position of a first side of one cluster of a plurality of TSV clusters and the TSV is, the larger the grounding response signal detected in a corresponding testing region is, and the greater the distance between a center position of a first side of one cluster of a plurality of TSV clusters and the TSV is, the smaller the grounding response signal detected in a corresponding testing region is. The processor may determine the correlation between the noise of the substrate and the plurality of distances based on the plurality of testing data (i.e., the plurality of response signals). The processor may determine a correlation between the noise received from the substrate at a contacting point where the substrate contacts the testing region and a distance between the contacting point and a side wall of an excitation TSV of the at least two groups of second TSVs.

By obtaining the grounding disturbance signals of different testing regions, the plurality of testing data may be obtained, and the correlation between the noise of the substrate and the plurality of distances may be further obtained. Therefore, a circuit design may be performed based on the correlation. For example, when a noise level of the noise of the substrate is required to be less than 1 millivolt, no circuit component (e.g., a transistor) may be designed within a distance around TSV with a noise level equal to or more than 1 millivolt on the substrate.

In some embodiments, at least one group of third TSVs may also include a plurality of TSV clusters, and the one or more testing regions may include a plurality of testing positions, one of the plurality of testing positions may be located in one of the plurality of TSV clusters. The plurality of TSV clusters may be distributed in at least one testing ring band surrounding the excitation link. The plurality of TSV clusters distributed in a surrounding distribution may form a testing band. More descriptions for the TSV clusters distributed in a surrounding distribution may be found elsewhere in the present disclosure, for example, FIG. 7, and the relevant descriptions.

In some embodiments, the processor may obtain a plurality of response signals from the plurality of testing positions in each testing ring band of the at least one testing ring band. Due to different testing positions, the plurality of response signals may be different, and the plurality of response signals may reflect the noise of the substrate in different directions. In some embodiments, the plurality of testing interfaces may be electrically connected at the plurality of testing positions in each testing ring band to obtain the plurality of response signals from the plurality of testing positions based on the plurality of testing interfaces.

In some embodiments, if the plurality of TSV clusters may distributed in at least one test ring band surrounding the excitation link, the processor may obtain the plurality of response signals in each testing ring band of the at least one testing ring band. The processor may determine the distribution of noise at different positions and directions based on the plurality of response signals, such as drawing noise contour lines. Furthermore, the processor may determine the distribution of defects on the substrate in a plane perpendicular to an axial direction of a TSV among the at least two groups of second TSVs and the at least one groups of third TSVs. With a surrounding structure of the device, a distribution of leakage regions in different directions in different sidewalls of the excitation TSV may be inferred based on the distribution of noise response signals at the contacting point with the same distance to sidewalls of the excitation TSVs, and a function relationship between different intervals between the contacting point and the sidewalls of the excitation TSVs and noise by providing the different intervals.

By comparing the plurality of response signals from the plurality of testing positions, an approximate position with the insulation performance reduction caused by a process operation (e.g., an over etching), which may be a position with high noise, may be roughly determined, and thus a design basis for circuit design may be provided.

FIG. 11 is another flowchart illustrating an exemplary process of a method for noise testing of a substrate including TSVs according to some embodiments of the present disclosure.

In 1110, a pulse signal may be applied to a first excitation TSV and a second excitation TSV. The first excitation TSV and the second excitation TSV may both be embedded on a first side of a substrate, and the first excitation TSV and the second excitation TSV may be electrically connected to form an excitation TSV pair.

In 1120, a grounding response pulse signal of at least one group of testing regions arranged around one of the first excitation TSV and the second excitation TSV may be obtained.

In 1130, a noise level and distribution of a noise of a substrate including TSVs may be determined based on one or more grounding response signals of one or more groups of testing regions.

More descriptions for the above operations may be found elsewhere in the present disclosure, for example. FIG. 10 and the relevant descriptions. A program instruction for testing the noise of the substrate including TSVs may be predetermined, and a corresponding operation may be executed after a computing device receives a trigger of the program instruction. That is, a device for noise testing of a substrate including TSVs may include the first TSV and the second TSV embedded on the first side (i.e., the top of the substrate) of the substrate, and the first TSV and the second excitation TSV may be electrically connected to form the excitation TSV pair. Based on the structures of the device and the program instruction, a pulse signal may be applied to the first TSV and the second excitation TSV. Then, the computing device may continue to execute the program instruction to obtain one or more grounding response signals of at least one groups of testing regions within a preset range around the excitation TSV, and determine a noise level and a distribution of the noise of the substrate based on the one or more grounding response signals.

It should be understood that the above process is implemented through computer program instructions, which may be provided to a processor of a general-purpose computer, a specialized computer, an embedded processor, or other programmable data processing device, so that the instructions executed by the processor of the computer or other programmable data processing device may achieve the noise testing for the substrate including the TSVs in the embodiments. Of course, these computer program instructions may also be stored in a computer readable memory that can guide a computer or other programmable data processing device to work in a specific way, causing the instructions stored in the computer readable memory to generate a manufacturing product including the instruction device. Alternatively, these computer program instructions may also be loaded onto a computer or other programmable data processing device to perform a series of operations on the computer or other programmable device to generate computer-implemented processing, thereby executing the computer program instructions on the computer or other programmable device to achieve the above functions.

The principles and logic of implementing each operation or step according to program instructions in the embodiments may be the same as those of each embodiment in the above testing structure, which may not be repeated in the embodiments of the present disclosure. Of course, when implementing the noise testing for the substrate including the TSVs in combination with program instructions, the implementation method may adapt to processing, which may not be limited in the embodiments of the present disclosure.

In one embodiment, each group of testing regions may include: a first testing region and/or a second testing region. The process of determining a noise level and a distribution of a noise of the substrate based on the one or more response signals in operation 1130 above may include: determining the noise level and the distribution of the noise of the substrate by measuring the grounding response signals of the second testing region and/or first testing region when a square wave pulse passing through the excitation TSV pair. In some embodiments of the present disclosure, the effect of monitoring noise signals from the first side, the second side, respectively, or simultaneously monitoring the first side and the second side of the substrate may be reached.

On the basis of the above method for noise testing of a substrate including TSVs, the embodiments of the present disclosure also provide a device for noise testing of a substrate including TSVs. The device may include a signal application module, a signal acquisition module, and a noise determination module.

The signal application module may be configured to apply a pulse signal to the first excitation TSV and the second excitation TSV. The first excitation TSV and the second excitation TSV may be embedded on the first side of the substrate, and the first excitation TSV and the second excitation TSV may be electrically connected to form an excitation TSV pair.

The signal acquisition module may be configured to obtain one or more grounding response pulse signals in at least one group of testing regions around the excitation TSV.

The noise determination module may be configured to determine the noise level and the distribution of the noise of the substrate based on the one or more ground response signals.

The implementation principles of each operation or step in the device for noise testing of a substrate including TSVs mentioned above may be the same as the principles and logic of each embodiment in the method for noise testing of a substrate including TSVs, which may be found elsewhere in the present disclosure, and may not be repeated herein.

In addition, a computing device is provided in the embodiments of the present disclosure, which includes a memory and a processor, in which a computer program is stored. When the computer program is executed, the processor may perform the operations of the method for noise testing of a substrate including TSVs provided in the above-mentioned embodiments.

The processor may be seen as a very large scale integrated circuit, which may include an arithmetic unit, controller, register, memory, or the like. The processor may include, but may not be limited to, a central processing unit (CPU), a graphics processing unit (GPU), a field programmable gate array (FPGA), a digital signal processing (DSP), application specific integrated circuit (ASIC), etc., which may not be limited in the present disclosure. The computing device refer to any terminal or electronic device that requires external or built-in power supply, such as various personal computers, laptops, mobile phones (smart mobile terminals), tablets, and portable wearable devices, which may not be limited in the present disclosure. If the computing device is an external power supply, the external power supply may be a power adapter, a mobile power supply (a power bank, or a travel charger), etc., which may not be limited in the present disclosure.

A computer-readable storage medium is provided in the embodiments of the present disclosure, on which computer programs are stored. When the computer programs are executed by a processor, any operations for testing the noise of the substrate including TSVs provided in the above-mentioned embodiments may be implemented.

In some embodiments, according to the above description, those skilled in the art may understand that the present disclosure also provides an electronic device or device, which may include one or more of the above-mentioned boards.

According to different application scenarios, the computing device mentioned in the present disclosure may include a server, a cloud server, a server cluster, a data processing device, a robot, a computer, a tablet, an intelligent terminal, a PC device, an Internet of Things (IoT) terminal, a mobile terminal, a mobile phone, a wearable device, a visual terminal, and/or a medical device. The medical device may include a magnetic resonance imaging (MRI) machine, a B-scan ultrasonography machine, and/or an electrocardiogram machine. In the present disclosure, a unit illustrated as a separate component may or may not be physically separated, and a component illustrated as a unit may or may not be a physical unit. The above-mentioned components or units may be located on the same location or distributed across multiple network units. In addition, based on actual needs, some or all units may be selected to achieve the purpose of the scheme described in the embodiments of the present disclosure. In addition, in some scenarios, multiple units in the embodiments of the present disclosure may be integrated into one unit or each unit may physically exist separately.

In some embodiments, the integrated units mentioned above may be implemented in the form of software program modules. If the integrated units are achieved in the form of software program modules and sold or used as independent products, the integrated units may be stored in computer readable memory. Thus, when the solution of the present disclosure is embodied in the form of a software product (e.g., a computer readable storage medium), the software product may be stored in memory, which may include several instructions to enable the computing device (e.g., a personal computer, a server, or a network device, etc.) to perform some or all the operation of the method described in the embodiments of the present disclosure. The above-mentioned memory may include, but may not be limited to various media that can store program code, such as a USB flash drive, a flash drive, a read-only memory (ROM), a random-access memory (RAM), a portable hard drive, a magnetic disk, or an optical disc.

In other implementation scenarios, the integrated units mentioned above may also be implemented in hardware form, which may be a specific hardware circuit. The integrated units may include digital circuits and/or analog circuits. The physical realization of the hardware structure of the circuit may include, but may not be limited to, physical devices, which may include, but may not be limited to, devices such as transistors or memristor. In view of this, various devices described in the present disclosure, such as computing devices or other processing devices, may be implemented through appropriate hardware processors, such as CPUs, GPUs, FPGA, DSP, and ASICs. Furthermore, the above-mentioned storage unit or storage device may be any suitable storage medium (including magnetic storage medium or magneto-optical storage medium, etc.), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), a ROM, and a RAM.

Although some embodiments have been shown and described in the present disclosure, it is apparent to those skilled in the art that such embodiments are merely provided in the form of examples. Those skilled in the art may think of many ways to make changes, modifications, and substitutions without deviating from the ideas and spirit of the present disclosure. It should be understood that in the process of practicing the present disclosure, various alternative solutions to the embodiments described herein may be adopted. The claims aim to limit the scope of the present disclosure and therefore cover equivalent or alternative solutions within the scope of these claims.

In the above embodiments, the descriptions of each embodiment have their own emphasis. For a part that are not detailed in one embodiment may be refer to the relevant descriptions of other embodiments. The various technical features of the above embodiments may be combined arbitrarily. To make the description concise, not all possible combinations of each technical feature in the above embodiments have been described. However, as long as that there are no contradictions in the combination of these technical features, they should be considered within the scope of the present disclosure.

The above embodiments of the present disclosure have been described in detail. Specific examples are applied in the present disclosure to explain the principles and implementation methods of the present disclosure. The explanations of the above embodiments are merely used to help understand the methods and core ideas of the present disclosure. At the same time, any changes or deformations made by those skills in the art based on the specific implementation method and application scope of the present disclosure, in accordance with the ideas of the present disclosure, are within the scope of the present disclosure. In summary, the content of the present disclosure should not be understood as a limitation of the present disclosure.

What is claimed is:

1. A device, comprising:
   a substrate including first through silicon vias (TSVs);
   an excitation link including at least two groups of second TSVs;
   an insulation layer located under the excitation link and the substrate; and
   a testing link including at least one group of third TSVs, the testing link being electrically connected with the substrate;
   wherein an electrical path of the excitation link passes through the at least two groups of second TSVs of the excitation link along an axial direction of a through silicon via (TSV) among the first TSVs, the at least two groups of second TSVs, and the at least one group of third TSVs.

2. The device of claim 1, wherein
   the at least two groups of second TSVs include a first excitation TSV and a second excitation TSV,
   the excitation link includes a connecting conductor and at least two interface ends,
   the at least two interface ends are electrically connected with the first excitation TSV and the second excitation TSV, respectively,
   the at least two interface ends are arranged on a first side of the substrate,
   the connecting conductor is electrically connected with the first excitation TSV and the second excitation TSV,
   the connecting conductor is arranged on a second side of the substrate, and
   the first side and the second side are two sides on the substrate perpendicular to the axial direction of the TSV.

3. The device of claim 1, wherein the testing link includes one or more testing regions and a grounding region, the one or more testing regions are electrically connected with the grounding region via the substrate, the at least one group of third TSVs includes a grounding TSV, and the grounding TSV is arranged in the grounding region.

4. The device of claim 3, wherein a contact area between a conductor of the grounding TSV and the substrate is not less than 90% of an area of a side of the grounding TSV.

5. The device of claim 4, wherein an etching barrier layer is arranged on a second side of the substrate, and a projection of the etching barrier layer covers a projection of the grounding TSV on a direction perpendicular to an axial direction of a TSV among the first TSVs, the at least two groups of second TSVs, and the at least one group of third TSVs.

6. The device of claim 3, wherein the one or more testing regions include a first testing region and/or a second testing region, wherein
   the first testing region includes a first contacting region and a first testing interface electrically connected with the first contacting region, wherein the first contacting region is in contact with the substrate on a first side of the substrate, and the second testing region includes a second contacting region and a second testing interface electrically connected with the second contacting region, the second contacting region is in contact with the substrate on a second side of the substrate, and the first side and second side are two sides on the substrate perpendicular to an axial direction of a TSV among the first TSVs, the at least two groups of second TSVs, and the at least one group of third TSVs.

7. The device of claim 6, wherein the at least one group of third TSVs includes at least one TSV cluster, and the second contacting region is electrically connected with the second testing interface via the at least one TSV cluster.

8. The device of claim 7, wherein one of the at least one TSV cluster includes at least two TSVs in a parallel connection, and the at least two TSVs are electrically connected with the first side and second side, respectively.

9. The device of claim 8, wherein the at least two TSVs are electrically connected with the second testing interface on the first side.

10. The device of claim 7, wherein the first contacting region is electrically connected with the at least one TSV cluster on the first side, and the first testing interface and the second testing interface is a same testing interface.

11. The device of claim 7, wherein a cluster count of the at least one TSV cluster is more than 1, and a distance between a center position of a first side of one of the at least one TSV cluster and a TSV of the at least two group of second TSVs is different from a distance between a center position of a first side of another one of the at least one TSV cluster and the TSV.

12. The device of claim 7, wherein the at least one group of third TSVs includes a plurality of TSV clusters, and the plurality of TSV clusters are distributed surrounding at least one TSV of the at least two groups of second TSVs.

13. The device of claim 1, further comprising a carrier wafer, and the carrier wafer is detachably connected with the substrate.

14. A method implemented on a device including a substrate including first through silicon vias (TSVs); an excitation link including at least two groups of second TSVs; an insulation layer located under the excitation link and the substrate; and a testing link including at least one group of third TSVs, the testing link being electrically connected with the substrate, the method comprising:
  applying a pulse signal to the excitation link;
  obtaining one or more response signals in the testing link;
  wherein the testing link includes one or more testing regions and a grounding region, wherein the one or more testing regions is electrically connected with the grounding area via the substrate, and the at least one group of third TSVs includes a grounding through silicon via (TSV), the grounding region is arranged at the grounding TSV, and the one or more response signals are grounding response signals of the one or more testing regions relative to the grounding region; and
  determining, based on the one or more response signals, a noise level and a distribution of a noise of the substrate.

15. The method of claim 14, wherein
the one or more response signals include a first response signal of a first testing region in the one or more testing regions and a second response signal of a second testing region in the one or more testing regions, and
the method further comprises:
  determining, based on the first response signal, a first noise;
  determining, based on the second response signal, a second noise; and
  determining, based on the first noise and the second noise, a distribution of defects on the substrate along an axial direction of a TSV among the at least two groups of second TSVs and the at least one groups of third TSVs.

16. The method of claim 14, wherein the method further comprises:
  obtaining a plurality of response signals in the one or more response signals from a plurality of testing positions arranged at a plurality of TSV clusters in the one or more testing regions; and
  determining, based on the plurality of response signals, a correlation between the noise of the substrate and each of a plurality of distances is between a center position of a first side of one cluster of a plurality of TSV clusters in the at least one group of third TSVs and a TSV of the at least two groups of second TSVs.

17. The method of claim 14, wherein the method further comprises:
  obtaining a plurality of response signals in the one or more response signals in each testing ring band of at least one testing ring band surrounding the excitation link; and
  determining, based on the plurality of response signals, a distribution of defects on the substrate in a plane perpendicular to an axial direction of a TSV among the at least two groups of second TSVs and the at least one groups of third TSVs.

\* \* \* \* \*